United States Patent
Huang et al.

(10) Patent No.: US 11,264,864 B2
(45) Date of Patent: Mar. 1, 2022

(54) FLAT-MOTOR DRIVING METHOD AND DRIVE CIRCUIT, AND ELECTRONIC DEVICE

(71) Applicant: Honor Device Co., Ltd., Guangdong (CN)

(72) Inventors: Ting Huang, Beijing (CN); Tieli Zhang, Beijing (CN); Zhi Chang, Beijing (CN); Xuan Li, Shenzhen (CN); Jianli Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 279 days.

(21) Appl. No.: 16/616,020

(22) PCT Filed: Sep. 30, 2017

(86) PCT No.: PCT/CN2017/105160
§ 371 (c)(1),
(2) Date: Nov. 22, 2019

(87) PCT Pub. No.: WO2018/214380
PCT Pub. Date: Nov. 29, 2018

(65) Prior Publication Data
US 2020/0083779 A1    Mar. 12, 2020

(30) Foreign Application Priority Data

May 24, 2017   (CN) .......................... 201710374736.9

(51) Int. Cl.
    *H02K 7/06*       (2006.01)
    *B06B 1/04*       (2006.01)
    *H02P 7/28*       (2016.01)
(52) U.S. Cl.
    CPC .............. *H02K 7/063* (2013.01); *B06B 1/04* (2013.01); *H02P 7/28* (2013.01)

(58) Field of Classification Search
    CPC .. H02K 7/06; H02K 7/063; H02P 7/28; H02P 25/032; B06B 1/04
    See application file for complete search history.

(56) References Cited

U.S. PATENT DOCUMENTS

| 2013/0076292 | A1  | 3/2013  | Okada et al. |
| 2016/0322925 | A1  | 11/2016 | Pietromonaco |
| 2018/0123494 | A1* | 5/2018  | Xie ..................... H02P 25/032 |

FOREIGN PATENT DOCUMENTS

| CN | 102570945 A | 7/2012 |
| CN | 103095186 A | 5/2013 |

(Continued)

OTHER PUBLICATIONS

Machine Translation and Abstract of Chinese Publication No. CN102570945, Jul. 11, 2012, 12 pages.

(Continued)

*Primary Examiner* — Naishadh N Desai
(74) *Attorney, Agent, or Firm* — Conley Rose, P.C.

(57) ABSTRACT

An electronic device includes a signal trigger circuit, a flat-motor drive circuit, and a flat motor. The signal trigger circuit sends a starting instruction to the flat-motor drive circuit for instructing to start the flat motor. A processor of the flat-motor drive circuit sends a first triggering instruction to a voltage processing circuit of the flat-motor drive circuit after receiving the starting instruction. The voltage processing circuit provides a first working voltage V1 to the flat motor after receiving the first triggering instruction, and provides a second working voltage V0 to the flat motor after a first time period. $V0<V1 \leq V2$, V0 is a rated voltage value of the flat motor, and V2 is a maximum forward voltage value that the flat motor can bear when the flat motor is started.

20 Claims, 8 Drawing Sheets

(56) References Cited

FOREIGN PATENT DOCUMENTS

| CN | 202966530 U | 6/2013 | |
|---|---|---|---|
| CN | 103418087 A | 12/2013 | |
| CN | 204244260 U | 4/2015 | |
| CN | 104767440 A | 7/2015 | |
| CN | 106688173 A | 5/2017 | |
| WO | 2016092289 A1 | 6/2016 | |
| WO | WO-2018214380 A1 * | 11/2018 | ............... H02P 7/28 |

OTHER PUBLICATIONS

Machine Translation and Abstract of Chinese Publication No. CN103418087, Dec. 4, 2013, 31 pages.
Machine Translation and Abstract of Chinese Publication No. CN104767440, Jul. 8, 2015, 9 pages.
Machine Translation and Abstract of Chinese Publication No. CN204244260, Apr. 1, 2015, 7 pages.
Foreign Communication From A Counterpart Application, PCT Application No. PCT/CN2017/105160, English Translation of International Search Report dated Feb. 22, 2018, 2 pages.
Foreign Communication From A Counterpart Application, PCT Application No. PCT/CN2017/105160, English Translation of Written Opinion dated Feb. 22, 2018, 5 pages.

* cited by examiner

FLAT-MOTOR DRIVING METHOD AND DRIVE CIRCUIT, AND ELECTRONIC DEVICE

CROSS-REFERENCE TO RELATED APPLICATIONS

This application is a national stage of International Application No. PCT/CN2017/105160, filed on Sep. 30, 2017, which claims priority to Chinese Patent Application No. 201710374736.9, filed on May 24, 2017. Both of the aforementioned applications are hereby incorporated by reference in their entireties.

TECHNICAL FIELD

Embodiments of the present invention relate to the field of electronic technologies, and in particular, to a flat-motor driving method and drive circuit, and an electronic device.

BACKGROUND

A vibration alerting function is a common function of an electronic device such as a smartphone. Because flat motors have advantages such as low costs, simple structure, high reliability, low noise, low power consumption, and strong vibration, the flat motors are widely applied to electronic devices.

Currently, a time for starting a flat motor to vibrate is relatively long and the flat motor cannot be quickly started, thereby affecting user experience.

SUMMARY

Embodiments of the present invention provide a flat-motor driving method and drive circuit, and an electronic device, so as to quickly start a flat motor to vibrate.

According to a first aspect, an embodiment of the present invention provides a flat-motor driving method, where the method is applied to an electronic device, the electronic device includes a signal trigger circuit, a flat-motor drive circuit, and a flat motor; the flat-motor drive circuit includes a processor and a voltage processing circuit; and the driving method includes the following steps:

sending, by the signal trigger circuit to the processor, a starting instruction for instructing to start the flat motor;

receiving, by the processor, the starting instruction, and sending a first triggering instruction to the voltage processing circuit after receiving the starting instruction, where the first triggering instruction is used to trigger the voltage processing circuit to provide a forward voltage to the flat motor; and providing, by the voltage processing circuit, a first working voltage V1 to the flat motor after receiving the first triggering instruction, and providing a second working voltage V0 to the flat motor after a first time period, where $V0 < V1 \leq V2$, V0 is a rated voltage value of the flat motor, and V2 is a maximum forward voltage value that the flat motor can bear when the flat motor is started.

Compared with a prior-art drive circuit using a rated voltage for starting a flat motor, the flat-motor drive circuit provided in this embodiment of the present invention facilitates accelerating starting of the flat motor.

In some possible implementations of the present invention, the voltage processing circuit includes a boost circuit and a first circuit, and the boost circuit and the first circuit are connected in parallel; and the providing, by the voltage processing circuit, a first working voltage V1 to the flat motor after receiving the first triggering instruction, and providing a second working voltage V0 to the flat motor after a first time period includes:

outputting, by the boost circuit, the first working voltage V1 to the flat motor in the first time period after receiving the first triggering instruction; and outputting, by the first circuit after receiving the first triggering instruction, the second working voltage V0 to the flat motor after the first time period.

In some possible implementations of the present invention, the boost circuit includes a first capacitor C1, a first resistor R1, and a boost chip, where a first end of the first capacitor C1 is connected to the processor, and is used to receive the first triggering instruction sent by the processor; a second end of the first capacitor C1 is grounded by using the first resistor R1, and the second end of the first capacitor C1 is further connected to an input end of the boost chip; and an output end of the boost chip is connected to the flat motor; and the outputting, by the boost circuit, the first working voltage V1 to the flat motor in the first time period after receiving the first triggering instruction includes:

providing, by the second end of the first capacitor, a voltage signal greater than a minimum working voltage of the boost chip to the input end of the boost chip in the first time period after the first end of the first capacitor C1 receives the first triggering instruction, to trigger the boost chip to work, so that the boost chip outputs the first working voltage V1 to the flat motor.

In some possible implementations of the present invention, the first circuit includes a voltage stabilizing circuit and a first unidirectional conduction circuit that are connected in series; and the outputting, by the first circuit after receiving the first triggering instruction, the second working voltage V0 to the flat motor after the first time period includes:

outputting, by the voltage stabilizing circuit, the second working voltage V0 after an input end of the voltage stabilizing circuit receives the first triggering instruction, where the first unidirectional conduction circuit prevents, in the first time period, output electric energy of the boost circuit from flowing backward to the first circuit.

In some possible implementations of the present invention, the first circuit further includes a suspending circuit; the suspending circuit is connected between the processor and the voltage stabilizing circuit in series; the suspending circuit includes an energy storage element; the drive circuit further includes an on-off circuit, and the on-off circuit includes a grounding circuit and a control circuit; and the driving method may further include:

sending, by the signal trigger circuit, a motor running stop instruction to the processor;

stopping sending, by the processor, the first triggering instruction to the voltage processing circuit when receiving the motor running stop instruction;

providing, by the suspending circuit, a trigger voltage to the voltage stabilizing circuit in a second time period after the processor stops sending the first triggering instruction to the voltage processing circuit, to trigger the voltage stabilizing circuit to work, so that the voltage stabilizing circuit outputs a voltage; and connecting, by the control circuit in the second time period, the output voltage of the voltage stabilizing circuit to a negative electrode end of the flat motor, and grounding a positive electrode end of the flat motor by using the grounding circuit.

By providing a forward voltage exceeding the rated voltage to the flat motor in the first period, starting of the flat motor can be accelerated, and by applying a reverse voltage to the flat motor in a second period, braking of the flat motor can be accelerated, to make the flat motor quickly stopped. Therefore, this technical solution facilitates making the flat motor quickly started and quickly stopped.

According to a second aspect, an embodiment of the present invention provides a flat-motor drive circuit, including: a processor and a voltage processing circuit, where the processor is configured to receive a starting instruction for instructing to start a flat motor, and send a first triggering instruction to the voltage processing circuit after receiving the starting instruction, where the first triggering instruction is used to trigger the voltage processing circuit to provide a forward voltage to the flat motor; and the voltage processing circuit is configured to provide a first working voltage V1 to the flat motor after receiving the first triggering instruction, and provide a second working voltage V0 to the flat motor after a first time period, where $V0<V1\leq V2$, V0 is a rated voltage value of the flat motor, and V2 is a maximum forward voltage value that the flat motor can bear when the flat motor is started.

In some possible implementations of the present invention, the voltage processing circuit includes a boost circuit and a first circuit, and the boost circuit and the first circuit are connected in parallel;

the boost circuit is configured to output the first working voltage V1 in the first time period after receiving the first triggering instruction; and the first circuit is configured to output the second working voltage V0 after receiving the first triggering instruction.

In some possible implementations of the present invention, the boost circuit includes a first capacitor C1, a first resistor R1, and a boost chip, where a first end of the first capacitor C1 is connected to the processor, and is used to receive the first triggering instruction sent by the processor. A second end of the first capacitor C1 is grounded by using the first resistor R1, and the second end of the first capacitor C1 is further connected to an input end of the boost chip; and an output end of the boost chip is connected to the flat motor, and is used to provide the first working voltage V1 to the flat motor; and the first triggering instruction is a voltage signal V3, where $V4\leq V3\leq V5$, V4 is a minimum working voltage value of the boost chip, and V5 is a maximum working voltage value of the boost chip.

In some possible implementations of the present invention, the first circuit includes a voltage stabilizing circuit and a first unidirectional conduction circuit that are connected in series; an input end of the voltage stabilizing circuit is connected to an output end of the processor; an output end of the voltage stabilizing circuit is connected to an input end of the first unidirectional conduction circuit; and an output end of the first unidirectional conduction circuit is connected to an output end of the boost chip;

the first unidirectional conduction circuit is configured to prevent electric energy of the boost circuit from flowing backward; and the voltage stabilizing circuit is configured to provide a steady working voltage to the flat motor.

In some possible implementations of the present invention, the processor is further configured to: when receiving a motor running stop instruction, stop sending the first triggering instruction to the voltage processing circuit;

the first circuit further includes a suspending circuit; the suspending circuit is connected between the processor and the input end of the voltage stabilizing circuit in series; the suspending circuit includes an energy storage element and is configured to provide a trigger voltage to the voltage stabilizing circuit in a second time period after the processor stops sending the first triggering instruction to the voltage processing circuit, to trigger the voltage stabilizing circuit to output a voltage;

the drive circuit further includes an on-off circuit, and the on-off circuit includes a grounding circuit and a control circuit, where an input end of the control circuit is connected to output ends of the grounding circuit, the processor, and the voltage processing circuit, and an output end of the control circuit is connected to a positive electrode end and a negative electrode end of the flat motor; and the control circuit is configured to: when the processor sends the first triggering instruction to the voltage processing circuit, connect the output end of the voltage processing circuit to the positive electrode end of the flat motor, and ground the negative electrode end of the flat motor by using the grounding circuit; and is configured to: when the processor stops sending the first triggering instruction to the voltage processing circuit, connect the output end of the voltage processing circuit to the negative electrode end of the flat motor, and ground the positive electrode end of the flat motor by using the grounding circuit.

In this embodiment, by providing a forward voltage exceeding the rated voltage to the flat motor in the first period, starting of the flat motor can be accelerated, and by applying a reverse voltage to the flat motor in the second period, braking of the flat motor can be accelerated, to make the flat motor quickly stopped. Therefore, this technical solution facilitates making the flat motor quickly started and quickly stopped.

In some possible implementations of the present invention, the suspending circuit includes a second capacitor C2 and a second resistor R2;

a first end of the second resistor R2 is connected to the processor and a second end of the second resistor R2 is connected to the input end of the voltage stabilizing circuit; and a first end of the second capacitor C2 is connected to both the input end of the voltage stabilizing circuit and the second end of the second resistor R2, and a second end of the second capacitor C2 is grounded.

In some possible implementations of the present invention, the grounding circuit may be a power ground.

In some possible implementations of the present invention, the grounding circuit may include a metal oxide semiconductor MOS transistor and a second unidirectional conduction circuit; a grid electrode G of the MOS transistor is connected to both a second end of the second resistor R2 and a first end of the second capacitor C2; a second end of the first capacitor C1 is connected to the grid electrode G of the MOS transistor by using the second unidirectional conduction circuit; a source electrode S of the MOS transistor is grounded; and a drain electrode D of the MOS transistor is connected to the control circuit.

In some possible implementations of the present invention, the voltage stabilizer is a low dropout regulator LDO.

According to a third aspect, an embodiment of the present invention provides an electronic device, where the electronic device includes a signal trigger circuit, a flat-motor drive circuit, and a flat motor that are electrically connected;

the flat-motor drive circuit is electrically connected to both the signal trigger circuit and the flat motor, and the flat-motor drive circuit is configured to provide an input voltage to the flat motor under control of the signal trigger circuit; and the flat-motor drive circuit is the flat-motor drive circuit according to the second aspect or any one embodiment of the second aspect.

In some possible implementations of the present invention, the signal trigger circuit is a fingerprint sensor.

In the embodiments of the present invention, when the flat-motor drive circuit receives the starting instruction for starting the flat motor, the processor sends the first triggering instruction to the voltage processing circuit, where the first triggering instruction triggers the voltage processing circuit to provide a forward voltage greater than the rated voltage value to the flat motor. Because the forward voltage provided by the drive circuit to the flat motor is greater than the rated voltage, the embodiments of the present invention facilitate accelerating starting of the flat motor, so as to improve user experience.

In some improved embodiments, by providing, in the first period, a forward voltage exceeding the rated voltage to the flat motor, starting of the flat motor can be accelerated, and by applying a reverse voltage to the flat motor in a second period, braking of the flat motor can be accelerated, to make the flat motor quickly stopped. Therefore, some embodiments of the present invention facilitate making the flat motor quickly started and quickly stopped.

DESCRIPTION OF EMBODIMENTS

The embodiments of the present invention provide a flat-motor driving method and drive circuit, and an electronic device, so as to quickly start a flat motor to vibrate.

An electronic device provided with a flat motor, such as a mobile phone and a personal digital assistant, sometimes interacts with a user in a vibration manner. Specifically, the flat motor vibrates after running, and feeds back a status of an event to the user through vibration.

For example, when a screen of a mobile phone is turned off, if a user presses a fingerprint sensor, when an input fingerprint matches a preset fingerprint, a processor controls the mobile phone to be unlocked; and at this time, the processor provides a trigger signal to trigger a flat motor to be started, to generate a vibration effect. In this way, the user perceives touch. For another example, when the user selects a shortcut icon of an application in a touchscreen in a clicking manner, the processor provides a trigger signal to trigger the flat motor to run and vibrate, so as to prompt the user that the shortcut icon of the application is selected. Alternatively, a vibration effect may be generated when the fingerprint sensor detects that the fingerprint sensor is pressed. It should be noted that, a scenario in which the flat motor is triggered to vibrate is not limited.

In the embodiments of the present invention, the processor controls the flat motor to be driven by a high voltage greater than a rated voltage when the flat motor is to be started. This facilitates quickly starting the flat motor and makes the user perceive more acute vibration.

In some other possible implementations of the present invention, when the motor is triggered to stop vibration, the processor may control the motor to brake under the action of a reverse voltage. This facilitates making the motor quickly stopped and further improves user experience.

Figure 1A:
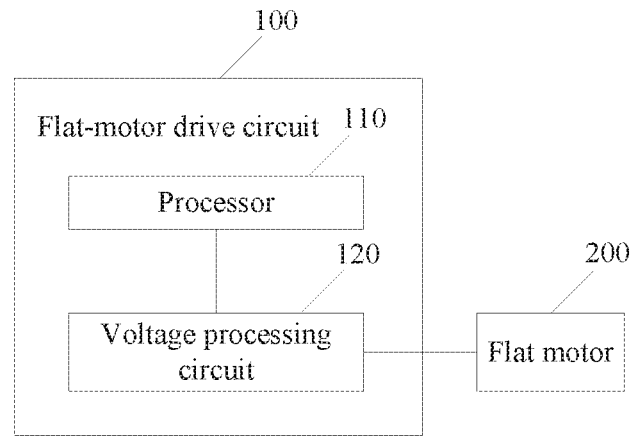
FIG. 1A is a schematic structural diagram of a flat-motor drive circuit according to an embodiment of the present invention.

FIG. 1A is a schematic structural diagram of a flat-motor drive circuit according to an embodiment of the present invention. The flat-motor drive circuit 100 shown in FIG. 1A includes a processor 110 and a voltage processing circuit 120. The processor 110 is configured to receive a starting instruction for instructing to start a flat motor, and send a first triggering instruction to the voltage processing circuit 120 after receiving the starting instruction. The first triggering instruction is used to trigger the voltage processing circuit 120 to provide a forward voltage $V1$ to a flat motor 200, where $V0 < V1 \leq V2$, $V0$ is a rated voltage value of the flat motor 200, and $V2$ is a maximum forward voltage value that the flat motor 200 can bear when the flat motor 200 is started. The voltage processing circuit 120 is configured to provide a working voltage to the flat motor 200. In some possible implementations of the present invention, as shown in FIG. 1B, the voltage processing circuit 120 may include a boost circuit 121, where the boost circuit 121 is configured to provide a forward voltage whose voltage value is $V1$ to the flat motor 200 after receiving the first triggering instruction.

The starting instruction may be triggered by using a signal trigger circuit such as a fingerprint sensor. For example, when a user presses the fingerprint sensor, if an input fingerprint matches a preset fingerprint, a starting instruction for starting the flat motor is triggered. In some possible implementations of the present invention, the starting instruction may be alternatively triggered when a user clicks a shortcut icon of an application in a display screen.

For example, when the starting instruction is triggered by using the fingerprint sensor, if the rated voltage $V0$ of the flat motor is 3V, the maximum forward voltage $V2$ that the flat motor can bear when the flat motor is started is 6V it should be noted that, $V2$ is a maximum forward voltage that the flat motor can bear in a short time interval. When the processor 110 receives the starting instruction, the processor 110 sends the first triggering instruction to the voltage processing circuit 120 to trigger the voltage processing circuit 120 to provide a forward voltage 5V to the flat motor 200. In this case, the flat motor 200 is started under the action of the forward voltage 5V. Compared with a prior-art drive circuit using a rated voltage 3V for starting a flat motor, the flat-motor drive circuit provided in this embodiment of the present invention facilitates accelerating starting of the flat motor.

Figure 1B:
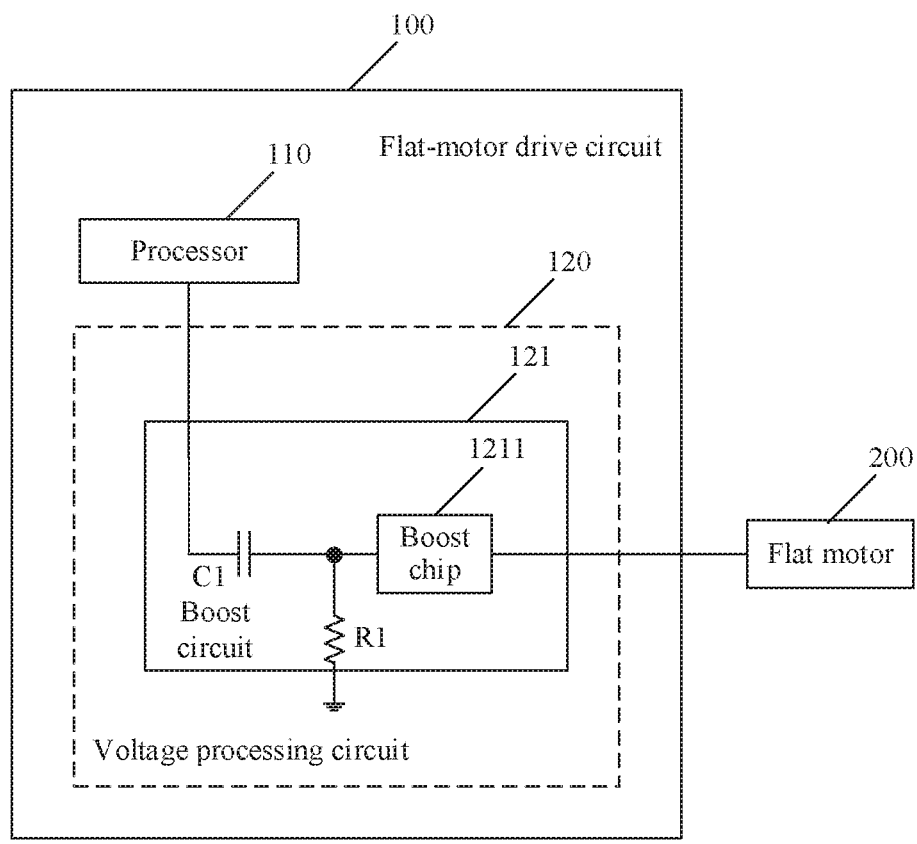
FIG. 1B is a schematic structural diagram of another flat-motor drive circuit according to an embodiment of the present invention.

In some possible implementations of the present invention, as shown in FIG. 1B, the boost circuit 121 may include a first capacitor C1, a first resistor R1, a boost chip 1211, where a first end of the first capacitor C1 is connected to the processor 110, a second end of the first capacitor C1 is grounded by using the first resistor R1, the second end of the first capacitor C1 is further connected to an input end of the boost chip 1211, and an output end of the boost chip 1211 is connected to the flat motor 200.

The first triggering instruction sent by the processor 110 to the voltage processing circuit 120 may be a voltage signal V3, where V4≤V3≤V5, V4 is a minimum working voltage of the boost chip 1211, and V5 is a maximum working voltage of the boost chip 1211. For example, in an embodiment of the present invention, V3 is 1.8V, V4 is 1V, V5 is 2V, and an output voltage of the boost chip 1211 when the boost chip 1211 works at a working voltage is 5V. Specifically, when the processor 110 outputs the voltage signal 1.8V to the first end of the first capacitor C1, a voltage of the second end of the first capacitor C1 instantly increases from 0V to 1.8V through induction, and the induced voltage is greater than V4. Therefore, the boost chip 1211 works and an output voltage of the boost chip 1211 is 5V. The first capacitor C1 performs electric discharging by using the first resistor R1, and the voltage of the second end of the first capacitor C1 decreases gradually; and when the voltage of the second end of the first capacitor C1 is less than 1V (the minimum working voltage of the boost chip 1211), the boost chip 1211 does not work.

Figure 1C:
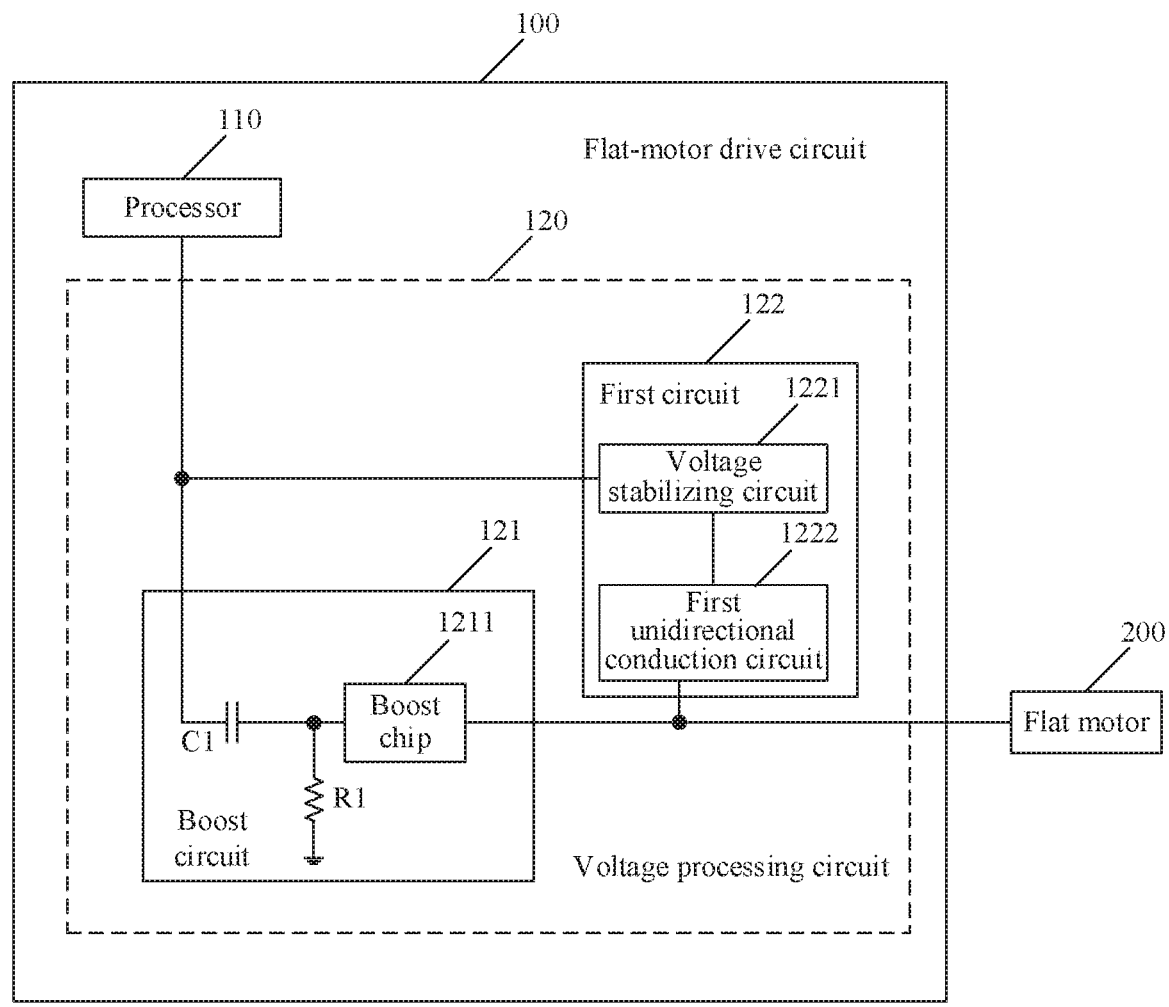
FIG. 1C is a schematic structural diagram of another flat-motor drive circuit according to an embodiment of the present invention.

In some possible implementations of the present invention, as shown in FIG. 1C, the voltage processing circuit may include a first circuit 122 that is connected to a boost circuit 121 in parallel. The first circuit 122 includes a voltage stabilizing circuit 1221 and a first unidirectional conduction circuit 1222 that are connected in series, where an input end of the first unidirectional conduction circuit 1222 is connected to an output end of the voltage stabilizing circuit 1221; and an output end of the first unidirectional conduction circuit 1222 is connected to an output end of the boost chip 1211; and the first unidirectional conduction circuit 1222 is configured to prevent electric energy of the boost circuit from flowing backward. In some possible implementations of the present invention, the first unidirectional conduction circuit 1222 may be a diode, where a positive electrode of the diode is connected to the output end of the voltage stabilizing circuit 1221, a negative electrode of the diode is connected to the output end of the boost chip 1211, and the voltage stabilizing circuit 1221 is configured to provide a steady working voltage to the flat motor 200.

After the processor 110 sends the first triggering instruction (for example, the first triggering instruction may be an output voltage signal 1.8V), an output voltage of the first circuit 122 is V0, where V0=3V, It can be understood that, when the boost chip 1211 in the boost circuit 121 outputs a voltage 5V, an output voltage of the voltage processing circuit 120 is 5V. When the voltage stabilizing circuit 1221 receives an input signal whose voltage value is within a working voltage range of the voltage stabilizing circuit 1221, the voltage stabilizing circuit 1221 outputs a steady voltage 3V. Based on a circuitous philosophy, the output voltage of the voltage processing circuit in this case is an output voltage 5V corresponding to the boost circuit.

As the first capacitor C1 performs electric discharging by using the first resistor R1, the voltage of the second end of the first capacitor C1 decreases gradually. When the voltage of the second end of the first capacitor C1 is less than the minimum working voltage of the boost chip 1211, the boost chip 1211 does not work. It should be noted that, in some possible implementations of the present invention, after sending the first triggering instruction and before receiving a motor running stop instruction, the processor 110 continuously sends the first triggering instruction (for example, continuously outputs the voltage 1.8V). When an output voltage of the processor 110 is greater than or equal to a lower limit 1V of a working voltage (1V to 2V) of the voltage stabilizing circuit 1221, and less than or equal to an upper limit 2V, the voltage stabilizing circuit 1221 outputs a voltage 3V, and the output voltage of the voltage processing circuit is an output voltage 3V of the first circuit. To be specific, after the processor 110 receives the starting instruction, during starting of the flat motor 200, the flat-motor drive circuit 100 first provides a high voltage exceeding the rated voltage of the flat motor 200 to the flat motor 200 by using the boost circuit 121; when the first capacitor C1 in the boost circuit 1211 performs electric discharging by using the first resistor R1, the boost circuit stops working when the voltage of the second end of the first capacitor C1 decreases to less than the minimum working voltage of the boost chip 1211; and then the voltage processing circuit 120 provides the rated voltage to the flat motor 200 by using the voltage stabilizing circuit 1221. It can be learned from FIG. 1C that, to prevent a current from flowing backward to the first circuit 122 when the boost chip 1211 outputs a high voltage, the first unidirectional conduction circuit 1222 is disposed in the first circuit 122. In some possible implementations of the present invention, the first unidirectional conduction circuit 1222 may be a diode, where a positive electrode of the diode is connected to the output end of the voltage stabilizing circuit 1221, and a negative electrode of the diode is connected to the output end of the boost chip 1211.

To make the flat motor quickly started and also quickly stopped to improve sensitivity of touch caused when the flat motor vibrates, in some possible implementations of the present invention, the flat-motor drive circuit shown in FIG. 1C is further optimized, to make the flat motor quickly started and also quickly stopped. Specifically, as shown in FIG. 2A, compared with the flat-motor drive circuit shown in FIG. 1C, a suspending circuit 1223 and an on-off circuit 123 are added to a circuit in FIG. 2A.

Figure 2A:
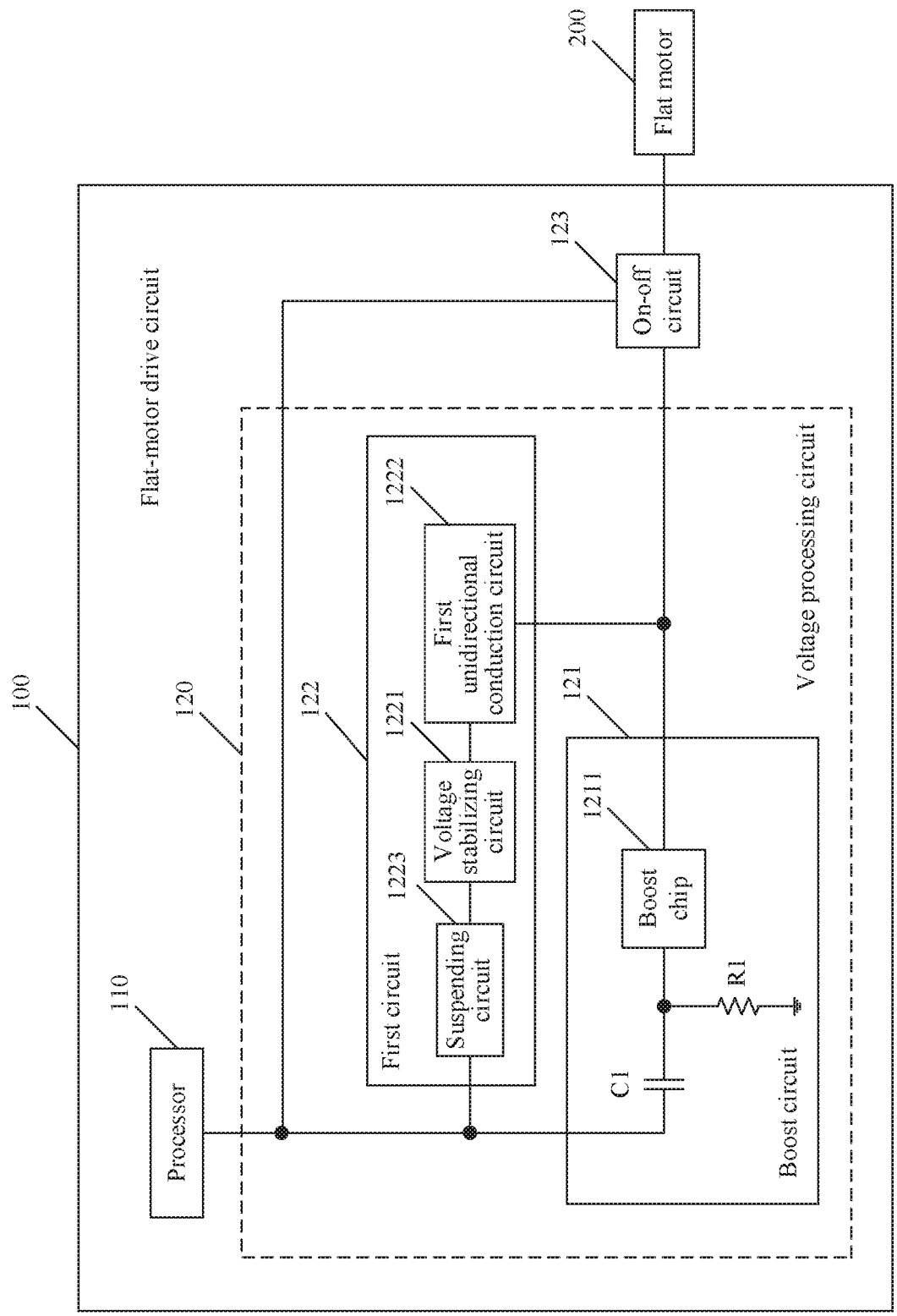
FIG. 2A is a schematic structural diagram of a flat-motor drive circuit according to an embodiment of the present invention.

In an implementation shown in FIG. 2A, when a processor 110 receives a motor running stop instruction, an input voltage provided by the processor 110 to a voltage processing circuit 120 is 0V. The suspending circuit 1223 is connected between an output end of the processor 110 and an input end of a voltage stabilizing circuit 1221 in series. The suspending circuit 1223 includes an energy storage element and is configured to: after the processor 110 receives the motor running stop instruction and when a voltage signal provided by the processor 110 to the voltage processing circuit 120 is less than a minimum working voltage of the voltage stabilizing circuit 1221, provide a starting trigger signal (that is, a voltage greater than 1V) whose duration is a second time period to the voltage stabilizing circuit 1221, and delay a time point at which an output voltage of the voltage stabilizing circuit 1221 decreases to 0. For example, if a working voltage of the voltage stabilizing circuit 1221 is 1V to 2V, a time point at which an input voltage of the voltage stabilizing circuit 1221 becomes less than 1V is delayed under control of the suspending circuit 1223. The voltage stabilizing circuit 1221 provides a reverse voltage to a flat motor 200 under control of the on-off circuit 123.

Specifically, when the processor 110 receives the motor running stop instruction, the processor 110 sends a control signal to the on-off circuit 123; after receiving the control signal, the on-off circuit 123 connects an output voltage of a first circuit 122 to a negative electrode end of the flat motor, and grounds a positive electrode end of the flat motor. To be specific, during control stopping of the flat motor 200, a flat-motor drive circuit 100 provides a reverse voltage to the flat motor 200. This facilitates accelerating stopping of the flat motor 200.

In some possible implementations of the present invention, the voltage stabilizer may be a low dropout regulator (Low Dropout Regulator, LDO).

Figure 2B:
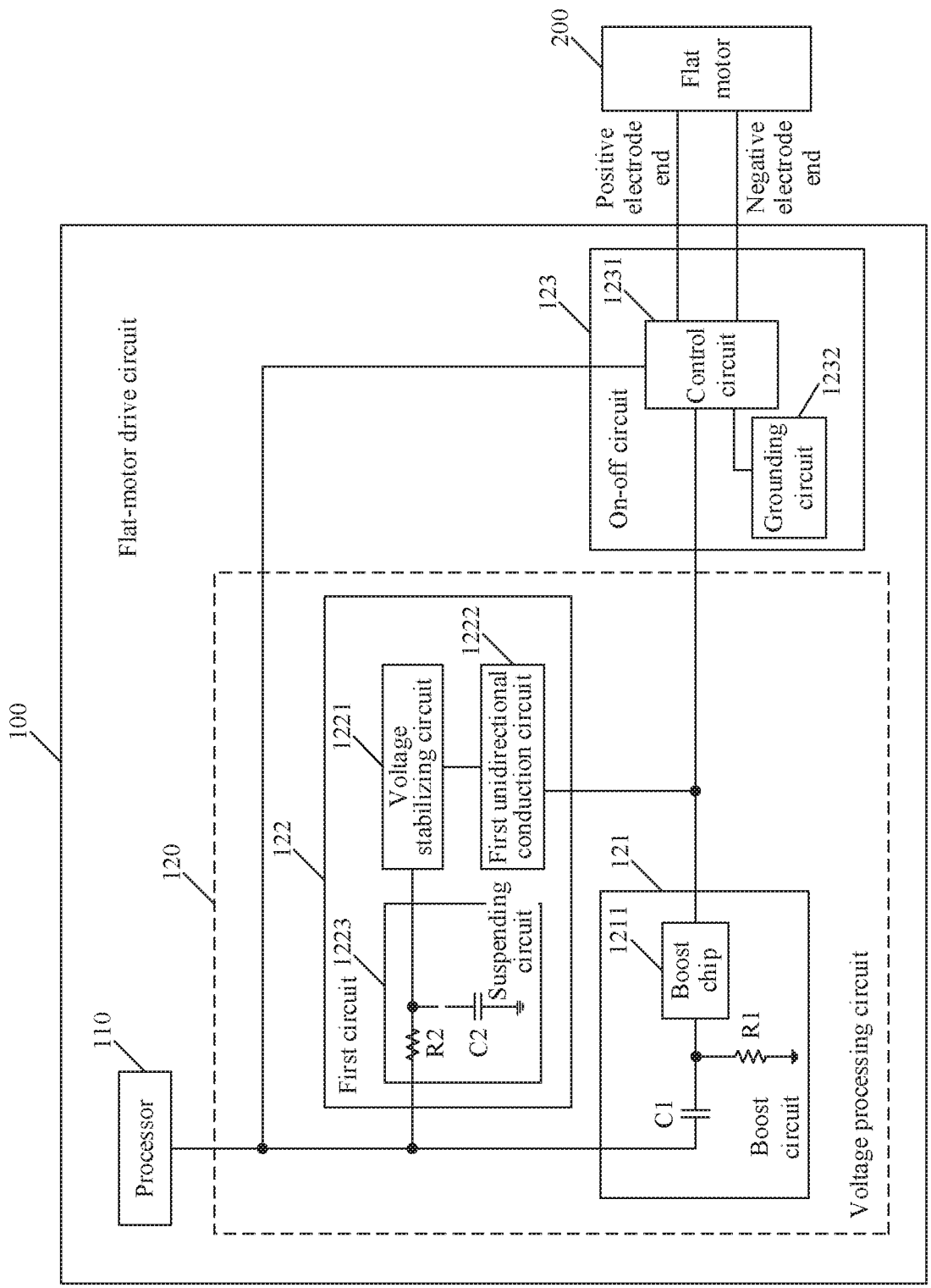
FIG. 2B is a schematic structural diagram of another flat-motor drive circuit according to an embodiment of the present invention.

In some possible implementations of the present invention, as shown in FIG. 2B, the on-off circuit 123 may include a control circuit 1231 and a grounding circuit 1232, where an input end of the control circuit 1231 is connected to output ends of the grounding circuit, the processor, and a boost chip 1211; an output end of the control circuit 1231 is connected to a positive electrode end and a negative electrode end of the flat motor 200; and the control circuit 1231 is configured to: when the processor sends a first triggering instruction to the voltage processing circuit, connect the output end of the boost chip 1211 to the positive electrode end of the flat motor, and ground the negative electrode end of the flat motor by using the grounding circuit. The control circuit is further configured to: when the processor 110 receives the motor running stop instruction, and the processor 110 no longer sends the first triggering signal to the voltage processing circuit, connect the output end of the boost chip 1211 to the negative electrode end of the flat motor 200, and ground the positive electrode end of the flat motor 200 by using the grounding circuit 1232. In this way, after the processor 110 receives the motor running stop instruction, the flat motor 200 brakes under the action of a reverse voltage. This facilitates accelerating stopping of the flat motor 200.

In some possible implementations of the present invention, as shown in FIG. 2B, the suspending circuit 1223 may include a second capacitor C2 and a second resistor R2, where a first end of the second resistor R2 is connected to an output end of the processor 110 and a second end of the second resistor R2 is connected to the input end of the voltage stabilizing circuit 1221; and a first end of the second capacitor C2 is connected to the second end of the second resistor R2, and a second end of the second capacitor C2 is grounded.

Figure 2C:
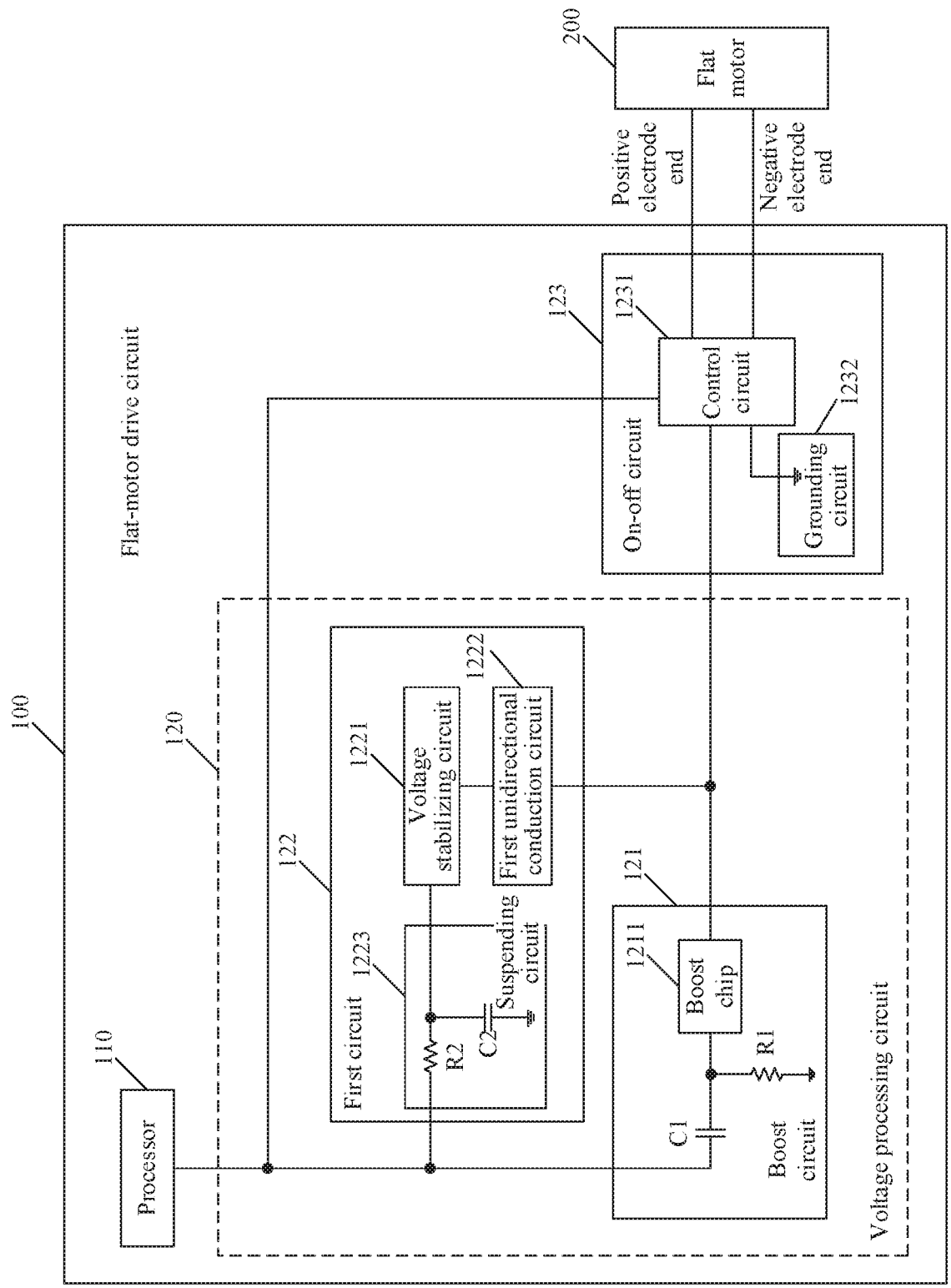
FIG. 2C is a schematic structural diagram of another flat-motor drive circuit according to an embodiment of the present invention.

In some possible implementations of the present invention, as shown in FIG. 2C, the grounding circuit 1232 is a power ground.

Figure 2D:
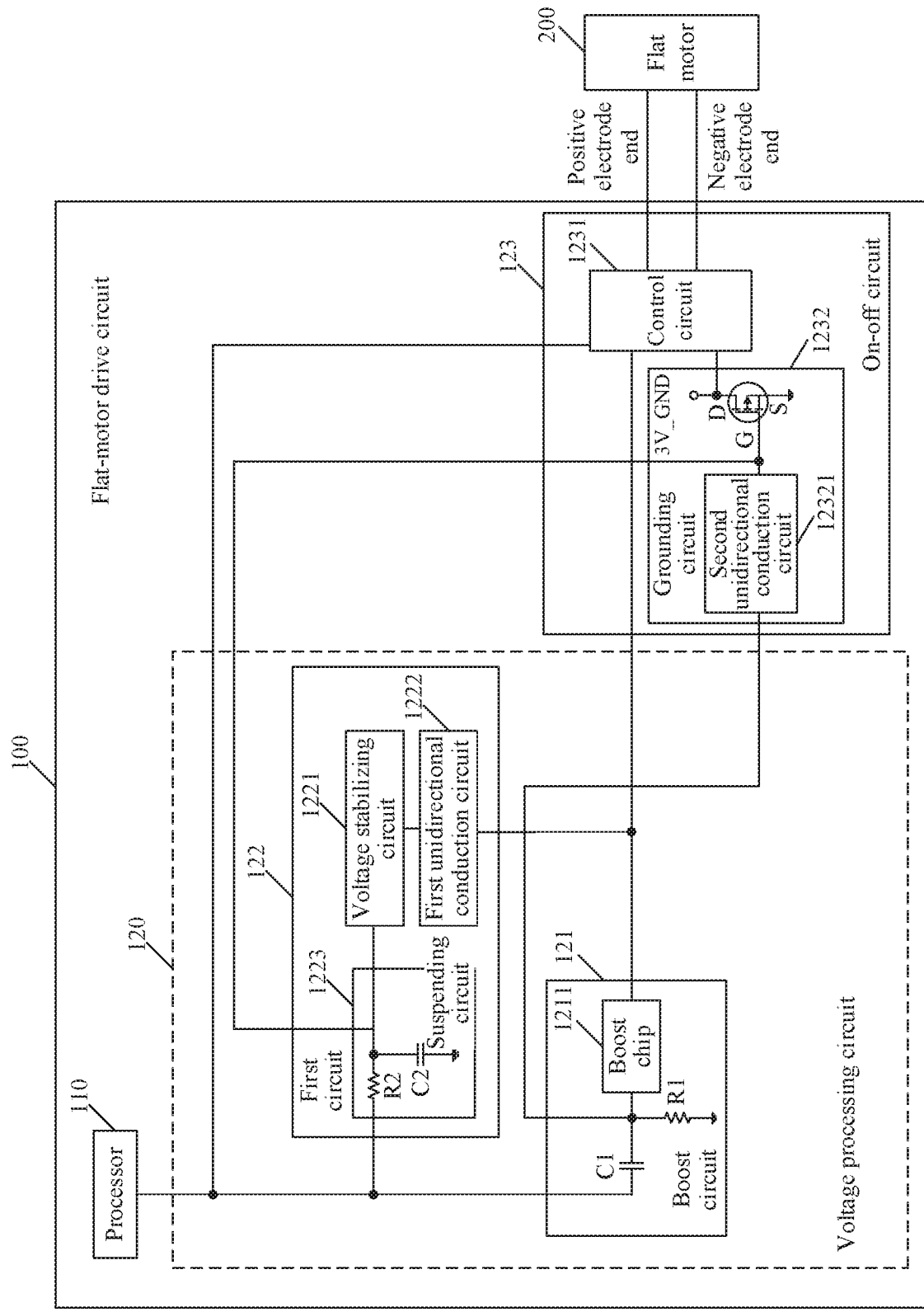
FIG. 2D is a schematic structural diagram of another flat-motor drive circuit according to an embodiment of the present invention.

In some possible implementations of the present invention, as shown in FIG. 2D, the grounding circuit 1232 may include a metal oxide semiconductor MOS transistor and a second unidirectional conduction circuit 12321, where a grid electrode G of the MOS transistor is connected to the second end of the second resistor R2; a second end of the first capacitor C1 is connected to the grid electrode G of the MOS transistor by using the second unidirectional conduction circuit; a source electrode S of the MOS transistor is grounded; and a drain electrode D of the MOS transistor is connected to the input end of the control circuit 1231. Therefore, when a first end of the first capacitor C1 is a high level or the first end of the second capacitor C2 of the suspending circuit 1223 is a high level, the grid electrode G of the MOS transistor is connected to the source electrode S; a voltage of the drain electrode D is 0; and the grounding circuit 1232 provides a voltage 0V to the control circuit 1231. To be specific, when the flat motor 200 begins to be started, the grounding circuit provides an output voltage 0V to the control circuit in a first time period (which starts from a time point at which the processor 110 receives a starting instruction and which is a corresponding time period in which a voltage of the second end of the first capacitor C1 is higher than a minimum working voltage of the boost chip 1211).

It should be noted that, the voltage stabilizing circuit 1221 provided in this embodiment of the present invention may be a controllable voltage stabilizing circuit, that is, a terminal may control, by using the foregoing first touch instruction, the voltage stabilizing circuit 1221 to output or not output a voltage. In another implementation, the voltage stabilizing circuit 1221 provided in this embodiment of the present invention may be alternatively an uncontrollable voltage stabilizing circuit. For example, when the voltage stabilizing circuit is compatible with a voltage stabilizer (for example, an LDO) of a system or when the voltage stabilizing circuit is a public voltage stabilizer (for example, an LDO) in a terminal, the voltage stabilizer is an uncontrollable voltage stabilizing circuit. In other words, the uncontrollable voltage stabilizing circuit outputs a working voltage all the time. In this embodiment of the present invention, for an uncontrollable voltage stabilizing circuit, a quick starting process may be controlled by controlling the grounding circuit. When the flat motor does not need to work, the grounding circuit is controlled to make the flat motor not grounded, so that a circuit between the voltage stabilizing circuit and the flat motor is disconnected. Although the voltage stabilizing circuit outputs a voltage, the flat motor is not powered because the circuit is disconnected. When the flat motor needs to be started, the circuit between the voltage stabilizing circuit and the flat motor is connected by controlling the grounding circuit to make the motor grounded.

Running of the flat-motor drive circuit may be divided into three phases, that is, a first phase, a second phase, and a third phase.

The first phase is a starting phase of the flat motor 200, is also a phase in which the boost circuit 121 outputs a high voltage signal to the control circuit 1231, where corresponding duration of the first phase is a first time period, where the first time period is a time interval between a time point at which the processor 110 receives the starting instruction and a corresponding time point at which the voltage of the second end of the first capacitor C1 becomes less than the minimum working voltage of the boost chip 1211; and when the boost chip 1211 works, a voltage of the output end of the boost chip 1211 is greater than a rated voltage of the flat motor 200. In the first phase, the grounding circuit 1232 outputs a voltage 0V. The control circuit connects the output end of the boost chip 1211 to the positive electrode end of the flat motor, and connects the grounding circuit to the negative electrode end of the flat motor. In this case, the flat motor can be quickly started when a starting voltage is greater than the rated voltage.

The second phase is a phase in which the first circuit 122 outputs a steady voltage to the control circuit 1231, where the output voltage value is the rated voltage of the flat motor 200. To be specific, the first capacitor C1 performs electric discharging at the first phase by using the first resistor R1; when the boost circuit does not output a high voltage greater than the rated voltage of the flat motor 200, the first phase ends and the second phase starts; and the flat motor runs under drive of the rated voltage at the second phase.

The third phase starts from a time point at which the processor receives the motor running stop instruction. At this time, the first circuit 122 begins to provide a reverse voltage to the flat motor 200. The third phase ends when the first circuit 122 no longer provides an output voltage to the flat motor 200, and corresponding duration of the third phase is a second time period. In the third phase, the processor stops sending the first triggering instruction to the voltage processing circuit, and the boost circuit 121 does not work; and the suspending circuit 1223 in the first circuit 122 provides a triggering instruction to the voltage stabilizing circuit 1221 to trigger the voltage stabilizing circuit 1221 to still work for a time period after the processor 110 receives the motor running stop instruction. Because the first circuit includes the second capacitor C2 that has an energy storage function then the processor no longer outputs the trigger signal, the first circuit 122 may continue to output a voltage for a time period. In the third phase, the control circuit 1231 connects an output end of the first circuit 122 to the negative electrode end of the flat motor, and connects an output end of the grounding circuit 1232 to the positive electrode end of the flat motor 200, or in other words, a reverse drive circuit is provided to the drive circuit when the motor begins to stop running. This facilitates quick braking of the flat motor and accelerates stopping of the flat motor. It can be understood that, the duration of the first phase and the duration of the second phase may be adjusted by changing values of the first capacitor, the first resistor, the second capacitor, and the second resistor.

It can be learned, through a simulation test, that quick starting and quick stopping of the circuit provided in the embodiments of the present invention can be well implemented. A specific process is as follows: Technical solutions provided in both the prior art and the embodiments of the present invention are used for a simulation test, and the following data is obtained: during control of starting a flat motor, a starting time of the flat motor in the prior art is 162 ms; and a starting time of the flat motor is shortened to 62 ms after using the technical solution provided in the embodiments of the present invention; and during control of stopping the flat motor, a stopping time of the flat motor in the prior art is 117 ms, and a stopping time of the flat motor is shortened to 41 ms after using the technical solution provided in the embodiments of the present invention.

Figure 3:
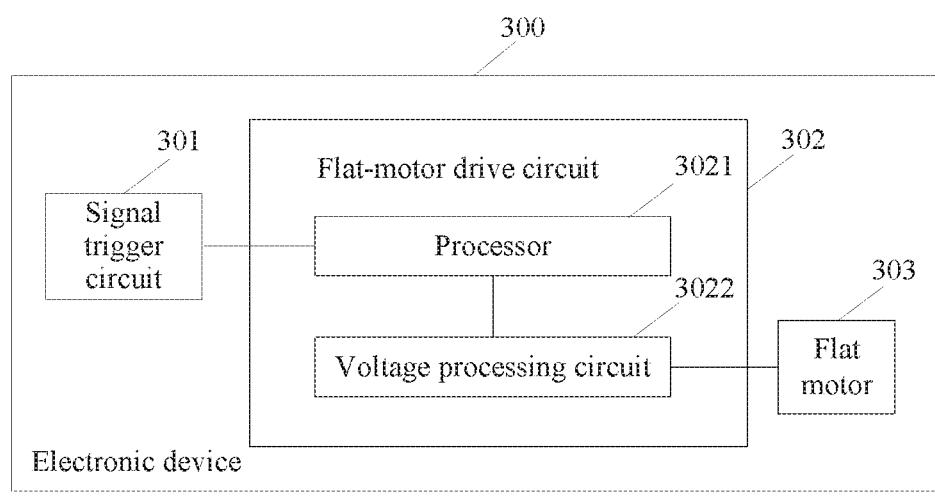
FIG. 3 is a schematic structural diagram of an electronic device according to an embodiment of the present invention.

FIG. 3 is a schematic structural diagram of an electronic device 300 according to an embodiment of the present invention. Specifically, as shown in FIG. 3, the electronic device 300 includes a signal trigger circuit 301, a flat-motor drive circuit 302, and a flat motor 303 that are electrically connected. The flat-motor drive circuit 302 includes a processor 3021 and a voltage processing circuit 3022 that are electrically connected. The signal trigger circuit 301 is configured to send, to the processor 3021 in the flat-motor drive circuit 302, a starting instruction for starting the flat motor and a motor running stop instruction for stopping running of the flat motor, where the flat-motor drive circuit 302 may be the flat-motor drive circuit in any one of the foregoing embodiments. Specifically, for the flat-motor drive circuit, refer to description of any one flat-motor drive circuit in FIG. 1A to FIG. 1C or FIG. 2A to FIG. 2D in the embodiments of the present invention. For brief description, details are not repeated herein.

Figure 4:
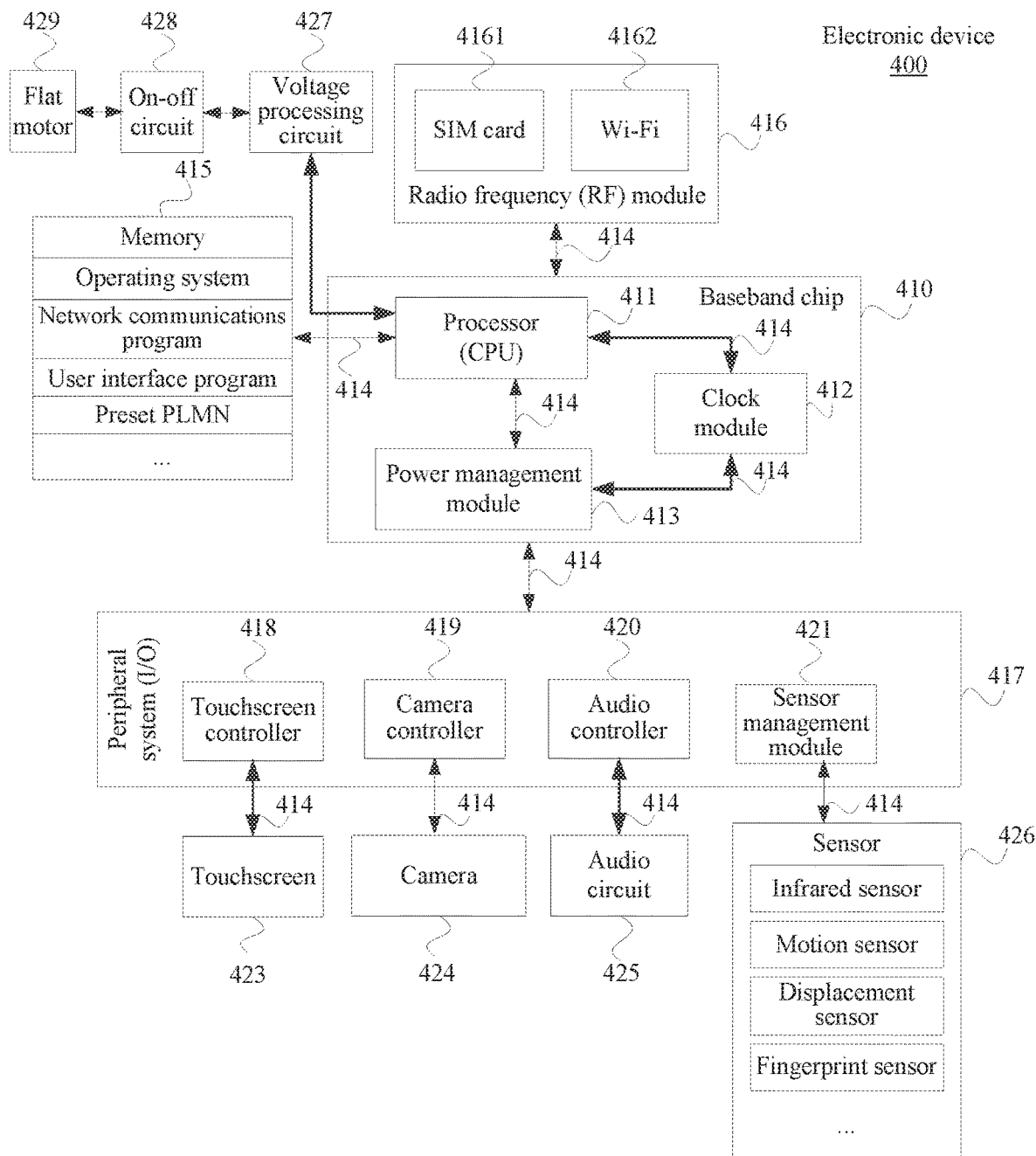
FIG. 4 is a schematic structural diagram of an electronic device according to an embodiment of the present invention.

FIG. 4 is a schematic structural diagram of an implementation of an electronic device according to this application. The electronic device may be a mobile phone. As shown in FIG. 4, the electronic device 400 may include a baseband chip 410, a memory 415 (one or more computer readable storage mediums), a radio frequency (RF) module 416, a peripheral system 417, a voltage processing circuit 427, an on-off circuit 428, a flat motor 429, and the like. These components may perform communication on one or more communications buses 414.

The peripheral system 417 is mainly configured to implement a function of interaction between the electronic device 400 and a user/an external environment, and mainly includes an input/output apparatus of the electronic device 400. In specific implementation, the peripheral system 417 may include a touchscreen controller 418, a camera controller 419, an audio controller 420, and a sensor management module 421. Each controller may be coupled with a peripheral device (for example, a touchscreen 423, a camera 424, an audio circuit 425, and a sensor 426) corresponding to the controller. It should be noted that, the peripheral system 417 may further include another I/O peripheral.

The baseband chip 410 may include one or more processors 411, a clock module 412, and a power management module 413 in an integrated manner. The clock module 412 integrated in the baseband chip 410 is mainly configured to generate a clock required in data transmission and time sequence control for the processor 411. The power management module 413 integrated in the baseband chip 410 is mainly configured to provide a steady high-precision voltage to the processor 411, the radio frequency module 416, and the peripheral system.

The radio frequency (RF) module 416 is configured to receive and send a radio frequency signal, and a receiver and a transmitter of the electronic device 400 are mainly integrated in the radio frequency (RF) module 416. The radio frequency (RF) module 416 communicates with a communications network and another communications device by using a radio frequency signal. In specific implementation, the radio frequency (RF) module 416 may include but not limit to an antenna system, an RF transceiver, one or more amplifiers, a tuner, one or more oscillators, a digital signal processor, a codec chip, a SIM card, a storage medium, and the like. In some embodiments, the radio frequency (RF) module 416 may be implemented in a single chip.

The memory 415 is coupled with the processor 411, and is configured to store various software programs and/or a plurality of groups of instructions. In specific implementation, the memory 415 may include a high-speed random access memory, and may also include a nonvolatile memory, for example, one or more disk storage devices, a flash memory device, or another nonvolatile solid state storage device. The memory 415 may store an operating system (referred to as a system below), for example, an embedded operating system such as ANDROID, IOS, WINDOWS, or LINUX. The memory 415 may further store a network communications program, where the network communications program may be used to perform communication with one or more auxiliary devices, one or more terminal devices, and one or more network devices. The memory 415 may further store a user interface program, where the user interface program may vividly display content of an application by using a graphical user interface, and receive, by using input controls such as a menu, a dialog box, and a key, a control operation performed by a user on the application.

A driving process of a flat motor is described by using the following scenario as an example: When a screen of the electronic device 400 is turned off, a fingerprint sensor is used for verifying a fingerprint; and if the fingerprint matches a preset fingerprint, the screen is awakened, and the flat motor vibrates.

If a fingerprint sensor in the sensor 426 obtains fingerprint information input by a user, the input fingerprint information is compared with fingerprint information preset in the memory. If the fingerprint information matches the preset fingerprint information, the sensor management module 221 sends a starting instruction for instructing to start the flat motor 429 to the processor 411, and the processor 411 sends a first triggering instruction to the voltage processing circuit 427 after receiving the starting instruction, where the first triggering instruction is used to trigger the voltage processing circuit to provide a forward voltage to the flat motor. The voltage processing circuit 427 provides a first working voltage V1 to the flat motor 429 after receiving the first triggering instruction, and provides a second working voltage V0 to the flat motor 429 after a first time period, where V0<V≤V2, V0 is a rated voltage value of the flat motor 429, and V2 is a maximum forward voltage value that the flat motor 429 can bear when the flat motor 429 is started.

In some possible implementations of the present invention, the voltage processing circuit 427 includes a boost circuit and a first circuit, where the boost circuit and the first circuit are connected in parallel; and the providing, by the voltage processing circuit 427, a first working voltage V1 to the flat motor 429 after receiving the first triggering instruction, and providing a second working voltage V0 to the flat motor 429 after a first time period includes: outputting, by the boost circuit, the first working voltage V1 to the flat motor 429 in the first time period after receiving the first triggering instruction; and outputting, by the first circuit after receiving the first triggering instruction, the second working voltage V0 to the flat motor 429 after the first time period.

Referring to FIG. 1B, in some possible implementations of the present invention, the boost circuit includes a first capacitor C1, a first resistor R1, and a boost chip, where a first end of the first capacitor C1 is connected to the processor, and is used to receive the first triggering instruction sent by the processor; a second end of the first capacitor C1 is grounded by using the first resistor R1, and the second end of the first capacitor C1 is further connected to an input end of the boost chip; and an output end of the boost chip is connected to the flat motor.

The outputting, by the boost circuit, the first working voltage V1 to the flat motor in the first time period after receiving the first triggering instruction includes:

providing, by the second end of the first capacitor, a voltage signal greater than a minimum working voltage of the boost chip to the input end of the boost chip in the first time period after the first end of the first capacitor C1 receives the first triggering instruction, to trigger the boost chip to work, so that the boost chip outputs the first working voltage V1 to the flat motor 429.

In some possible implementations of the present invention, referring to FIG. 1C, the first circuit includes a voltage stabilizing circuit and a first unidirectional conduction circuit that are connected in series; and the outputting, by the first circuit after receiving the first triggering instruction, the second working voltage V0 to the flat motor after the first time period includes:

outputting, by the voltage stabilizing circuit, the second working voltage V0 after an input end of the voltage stabilizing circuit receives the first triggering instruction, where the first unidirectional conduction circuit prevents, in the first time period, output electric energy of the boost circuit from flowing backward to the first circuit.

In some possible implementations of the present invention, referring to FIG. 2A, the first circuit further includes a suspending circuit; the suspending circuit is connected between the processor and the voltage stabilizing circuit in series; the suspending circuit includes an energy storage element; and the drive circuit further includes an on-off circuit, and the on-off circuit includes a grounding circuit and a control circuit. The driving method further includes:

sending, by the signal trigger circuit, a motor running stop instruction to the processor;

stopping sending, by the processor, the first triggering instruction to the voltage processing circuit when receiving the motor running stop instruction;

providing, by the suspending circuit, a trigger voltage to the voltage stabilizing circuit in a second time period after the processor stops sending the first triggering instruction to the voltage processing circuit, to trigger the voltage stabilizing circuit to work, so that the voltage stabilizing circuit outputs a voltage; and connecting, by the control circuit in the second time period, the output voltage of the voltage stabilizing circuit to a negative electrode end of the flat motor, and grounding a positive electrode end of the flat motor by using the grounding circuit.

It can be understood that, the foregoing only describes a possible implementation scenario. Quick starting of the flat motor or both quick starting and quick stopping of the flat motor may be alternatively implemented in other scenarios (for example, when a fingerprint is detected) by using the technical solutions in the embodiments of the present invention.

It should be understood that, the electronic device 400 is only an example provided in this application. In addition, the electronic device 400 may include components more or fewer than those components that are shown, may include a combination of two or more components, or may include components in different configurations.

It should be noted that, the processor in the drive circuit mentioned in each embodiment of the present invention may be a stand-alone processor, or may be another processor in a terminal. To be specific, the terminal may include one or more processors, where these processors have different functions, and one of the processors can have a function of the processor in the foregoing drive circuit in addition to another function.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the circuit division is merely logical function division and may be other division in actual implementation.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A flat-motor driving method, implemented by an electronic device, wherein the electronic device comprises a signal trigger circuit, a flat-motor drive circuit, and a flat motor, wherein the flat-motor drive circuit comprises a processor and a voltage processing circuit, and wherein the flat-motor driving method comprises:
  sending, by the signal trigger circuit to the processor, a starting instruction to start the flat motor;
  receiving, by the processor, the starting instruction;
  sending, by the processor to the voltage processing circuit and after the processor receives the starting instruction, a first triggering instruction to trigger the voltage processing circuit to provide a forward voltage to the flat motor;
  receiving, by the voltage processing circuit from the processor, the first triggering instruction;
  providing, by the voltage processing circuit to the flat motor and after the voltage processing circuit receives the first triggering instruction, a first working voltage (V1); and
  providing, by the voltage processing circuit to the flat motor and after a first time period, a second working voltage (V0), wherein the V0 is less than the V1 and the V1 is less than or equal to a maximum forward voltage value (V2) that the flat motor can bear when the flat motor is started, and wherein V0 is a rated voltage value of the flat motor.

2. The flat-motor driving method of claim 1, wherein the voltage processing circuit comprises a boost circuit and a first circuit coupled to the boost circuit in parallel, wherein providing the V1 and the V0 to the flat motor comprises:
  outputting, by the boost circuit and after receiving the first triggering instruction, the V1 to the flat motor in the first time period; and
  outputting, by the first circuit and after receiving the first triggering instruction, the V0 to the flat motor after the first time period.

3. The flat-motor driving method of claim 2, wherein the boost circuit comprises a first capacitor (C1), a first resistor (R1), and a boost chip, wherein a first end of the C1 is coupled to the processor and is configured to receive the first triggering instruction from the processor, wherein a second end of the C1 is grounded using the R1, wherein the second end of the C1 is further coupled to an input end of the boost chip, wherein an output end of the boost chip is coupled to the flat motor, wherein outputting the V1 to the flat motor comprises providing, by the second end of the first capacitor to the input end of the boost chip in the first time period and after the first end of the C1 receives the first triggering instruction, a voltage signal greater than a minimum working voltage of the boost chip to trigger the boost chip to output the V1 to the flat motor.

4. The flat-motor driving method of claim 2, wherein the first circuit comprises a voltage stabilizing circuit and a first unidirectional conduction circuit coupled to the voltage stabilizing circuit in series, wherein outputting the V0 to the flat motor comprises outputting, by the voltage stabilizing circuit and after an input end of the voltage stabilizing circuit receives the first triggering instruction, the V0, and wherein the first unidirectional conduction circuit is configured to prevent an output current of the boost circuit from flowing backward to the first circuit in the first time period.

5. The flat-motor driving method of claim 4, wherein the first circuit further comprises a suspending circuit coupled between the processor and the voltage stabilizing circuit in series, wherein the suspending circuit comprises an energy storage element, wherein the flat-motor drive circuit further comprises an on-off circuit, wherein the on-off circuit comprises a grounding circuit and a control circuit, and wherein the flat-motor driving method further comprises:
  sending, by the signal trigger circuit to the processor, a motor running stop instruction;
  receiving, by the processor from the signal trigger circuit, the motor running stop instruction;
  stopping the processor from sending the first triggering instruction to the voltage processing circuit when the processor receives the motor running stop instruction;
  providing, by the suspending circuit and after the processor stops sending the first triggering instruction to the voltage processing circuit, a trigger voltage to the voltage stabilizing circuit in a second time period to trigger the voltage stabilizing circuit to output an output voltage;
  outputting, in the second time period and by the control circuit, the output voltage of the voltage stabilizing circuit to a negative electrode end of the flat motor; and
  grounding a positive electrode end of the flat motor using the grounding circuit.

6. A flat-motor drive circuit, comprising:
  a voltage processing circuit; and
  a processor coupled to the voltage processing circuit and configured to:
    receive a starting instruction to start a flat motor; and
    send a first triggering instruction to the voltage processing circuit after receiving the starting instruction, wherein the first triggering instruction is configured to trigger the voltage processing circuit to provide a forward voltage to the flat motor,
  wherein the voltage processing circuit is configured to:
    receive, from the processor, the first triggering instruction;
    provide a first working voltage (V1) to the flat motor after receiving the first triggering instruction; and
    provide a second working voltage (V0) to the flat motor after a first time period, wherein the V0 is less than the V1 and the V1 is less than or equal to a maximum forward voltage value (V2) that the flat motor can bear when the flat motor is started, and wherein the V0 is a rated voltage value of the flat motor.

7. The flat-motor drive circuit of claim 6, wherein the voltage processing circuit comprises a boost circuit and a first circuit coupled to the boost circuit in parallel, wherein the boost circuit is configured to output the V1 in the first time period and after receiving the first triggering instruction, and wherein the first circuit is configured to output the V0 after receiving the first triggering instruction.

8. The flat-motor drive circuit of claim 7, wherein the boost circuit comprises a first capacitor (C1), a first resistor (R1), and a boost chip, wherein a first end of the C1 is coupled to the processor, wherein the C1 is configured to receive the first triggering instruction from the processor, wherein a second end of the C1 is grounded using the R1, wherein the second end of the C1 is further coupled to an input end of the boost chip, wherein an output end of the boost chip is coupled to the flat motor, wherein the boost chip is configured to provide the V1 to the flat motor, wherein the first triggering instruction is a voltage signal (V3), and wherein a minimum working voltage value (V4) of the boost chip is less than or equal to V3 and V3 is less than or equal to a maximum working voltage value (V5) of the boost chip.

9. The flat-motor drive circuit of claim 8, wherein the first circuit comprises a voltage stabilizing circuit and a first unidirectional conduction circuit coupled to the voltage stabilizing circuit in series, wherein an input end of the voltage stabilizing circuit is coupled to an output end of the processor, wherein an output end of the voltage stabilizing circuit is coupled to an input end of the first unidirectional conduction circuit, wherein an output end of the first unidirectional conduction circuit is coupled to an output end of the boost chip, wherein the first unidirectional conduction circuit is configured to prevent a current of the boost circuit from flowing backward, and wherein the voltage stabilizing circuit is configured to provide a steady working voltage to the flat motor.

10. The flat-motor drive circuit of claim 9, wherein the processor is further configured to stop sending the first triggering instruction to the voltage processing circuit when the processor receives a motor running stop instruction, wherein the first circuit further comprises a suspending circuit coupled between the processor and the input end of the voltage stabilizing circuit in series, wherein the suspending circuit comprises an energy storage element and is configured to provide a trigger voltage to the voltage stabilizing circuit in a second time period and after the processor stops sending the first triggering instruction to the voltage processing circuit to trigger the voltage stabilizing circuit to output a voltage, wherein the flat-motor drive circuit further comprises an on-off circuit that comprises a grounding circuit and a control circuit, wherein an input end of the control circuit is coupled to output ends of the grounding circuit, the processor, and the voltage processing circuit, wherein an output end of the control circuit is coupled to a positive electrode end and a negative electrode end of the flat motor, and wherein the control circuit is configured to:
couple the output end of the voltage processing circuit to the positive electrode end of the flat motor and ground the negative electrode end of the flat motor using the grounding circuit when the processor sends the first triggering instruction to the voltage processing circuit; and
couple the output end of the voltage processing circuit to the negative electrode end of the flat motor and ground the positive electrode end of the flat motor using the grounding circuit when the processor stops sending the first triggering instruction to the voltage processing circuit.

11. The flat-motor drive circuit of claim 10, wherein the suspending circuit comprises a second capacitor (C2) and a second resistor (R2), wherein a first end of the R2 is coupled to the processor and a second end of the R2 is coupled to the input end of the voltage stabilizing circuit, wherein a first end of the C2 is coupled to both the input end of the voltage stabilizing circuit and the second end of the R2, and wherein a second end of the C2 is grounded.

12. The flat-motor drive circuit of claim 10, wherein the grounding circuit is a power ground.

13. The flat-motor drive circuit of claim 10, further comprising a second resistor (R2) and a second capacitor (C2), wherein the grounding circuit comprises a metal oxide semiconductor (MOS) transistor and a second unidirectional conduction circuit, wherein the MOS transistor comprises a grid electrode (G), wherein the G is coupled to both a second end of the R2 and a first end of the C2, wherein a second end of the C1 is coupled to the G using the second unidirectional conduction circuit, wherein a source electrode of the MOS transistor is grounded, and wherein a drain electrode of the MOS transistor is coupled to the control circuit.

14. The flat-motor drive circuit of claim 9, wherein the voltage stabilizing circuit is a low dropout regulator (LDO).

15. An electronic device, comprising:
a signal trigger circuit;
a flat motor electrically coupled to the signal trigger circuit; and
a flat-motor drive circuit electrically coupled to both the signal trigger circuit and the flat motor, wherein the flat-motor drive circuit is configured to provide an input voltage to the flat motor under control of the signal trigger circuit, and wherein the flat-motor drive circuit comprises:
a voltage processing circuit; and
a processor coupled to the voltage processing circuit and configured to:
receive a starting instruction for instructing to start the flat motor; and
send a first triggering instruction to the voltage processing circuit after receiving the starting instruction, wherein the first triggering instruction is configured to trigger the voltage processing circuit to provide a forward voltage to the flat motor,
wherein the voltage processing circuit is configured to:
receive, from the processor, the first triggering instruction;
provide a first working voltage (V1) to the flat motor after receiving the first triggering instruction; and
provide a second working voltage (V0) to the flat motor after a first time period, wherein V0 is less than V1 and V1 is less than or equal to a maximum forward voltage value (V2) that the flat motor can bear when the flat motor is started, and wherein the V0 is a rated voltage value of the flat motor.

16. The electronic device of claim 15, wherein the signal trigger circuit is a fingerprint sensor.

17. The electronic device of claim 15, wherein the voltage processing circuit comprises a boost circuit and a first circuit coupled to the boost circuit in parallel, wherein the boost circuit is configured to output the V1 in the first time period after receiving the first triggering instruction, and wherein the first circuit is configured to output the V0 after receiving the first triggering instruction.

18. The electronic device of claim 17, wherein the boost circuit comprises a first capacitor (C1), a first resistor (R1), and a boost chip, wherein a first end of the C1 is coupled to the processor, wherein the C1 is configured to receive the first triggering instruction from the processor, wherein a second end of the C1 is grounded using the R1, wherein the second end of the C1 is further coupled to an input end of the boost chip, wherein an output end of the boost chip is coupled to the flat motor and is configured to provide the V1 to the flat motor, wherein the first triggering instruction is a voltage signal (V3), and wherein a minimum working voltage value (V4) of the boost chip is less than or equal to V3 and V3 is less than or equal to a maximum working voltage value (V5) of the boost chip.

19. The electronic device of claim 18, wherein the first circuit comprises a voltage stabilizing circuit and a first unidirectional conduction circuit coupled to the voltage stabilizing circuit in series, wherein an input end of the voltage stabilizing circuit is coupled to an output end of the processor, wherein an output end of the voltage stabilizing circuit is coupled to an input end of the first unidirectional conduction circuit, wherein an output end of the first unidirectional conduction circuit is coupled to an output end of the boost chip, wherein the first unidirectional conduction circuit is configured to prevent a current of the boost circuit from flowing backward, and wherein the voltage stabilizing circuit is configured to provide a steady working voltage to the flat motor.

20. The electronic device of claim 19, wherein the processor is further configured to receive a motor running stop instruction and stop sending the first triggering instruction to the voltage processing circuit, wherein the first circuit further comprises a suspending circuit, wherein the suspending circuit is coupled between the processor and the input end of the voltage stabilizing circuit in series, wherein the suspending circuit comprises an energy storage element and is configured to provide a trigger voltage to the voltage stabilizing circuit in a second time period after the processor stops sending the first triggering instruction to the voltage processing circuit to trigger the voltage stabilizing circuit to output a voltage, wherein the flat-motor drive circuit further comprises an on-off circuit that comprises a grounding circuit and a control circuit, wherein an input end of the control circuit is coupled to output ends of the grounding circuit, the processor, and the voltage processing circuit, wherein an output end of the control circuit is coupled to a positive electrode end and a negative electrode end of the flat motor, and wherein the control circuit is configured to:

couple the output end of the voltage processing circuit to the positive electrode end of the flat motor and ground the negative electrode end of the flat motor using the grounding circuit when the processor sends the first triggering instruction to the voltage processing circuit; and couple the output end of the voltage processing circuit to the negative electrode end of the flat motor and ground the positive electrode end of the flat motor using the grounding circuit when the processor stops sending the first triggering instruction to the voltage processing circuit.

\* \* \* \* \*

UNITED STATES PATENT AND TRADEMARK OFFICE
CERTIFICATE OF CORRECTION

PATENT NO. : 11,264,864 B2
APPLICATION NO. : 16/616020
DATED : March 1, 2022
INVENTOR(S) : Ting Huang et al.

It is certified that error appears in the above-identified patent and that said Letters Patent is hereby corrected as shown below:

On the Title Page

Item (57) Abstract, Line 11: "period. V0" should read "period. Where V0"

Signed and Sealed this
Tenth Day of May, 2022

Katherine Kelly Vidal
*Director of the United States Patent and Trademark Office*